US011203338B2

(12) United States Patent
Kuretake

(10) Patent No.: US 11,203,338 B2
(45) Date of Patent: Dec. 21, 2021

(54) VEHICLE

(71) Applicant: TOYOTA JIDOSHA KABUSHIKI KAISHA, Toyota (JP)

(72) Inventor: Ken Kuretake, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 179 days.

(21) Appl. No.: 16/164,293

(22) Filed: Oct. 18, 2018

(65) Prior Publication Data

US 2019/0118812 A1 Apr. 25, 2019

(30) Foreign Application Priority Data

Oct. 25, 2017 (JP) .............................. JP2017-206428

(51) Int. Cl.
*B60W 30/17* (2020.01)
*B60K 6/20* (2007.10)
*B60W 20/00* (2016.01)
*B60L 15/00* (2006.01)
*F02N 11/08* (2006.01)
*B60W 10/08* (2006.01)
(Continued)

(52) U.S. Cl.
CPC .............. *B60W 30/17* (2013.01); *B60K 6/20* (2013.01); *B60L 15/00* (2013.01); *B60W 10/06* (2013.01);
(Continued)

(58) Field of Classification Search
CPC ...... B60W 30/17; B60W 10/06; B60W 10/08; B60W 20/00; B60W 20/10;
(Continued)

(56) References Cited

U.S. PATENT DOCUMENTS 5,451,820 A * 9/1995 Gotoh ................... B60W 30/17
307/10.6
8,715,034 B1 * 5/2014 Wong ..................... A63H 17/42
446/454
(Continued)

FOREIGN PATENT DOCUMENTS

JP 11-257114 9/1999
JP 2006-316644 11/2006
(Continued)

*Primary Examiner* — Yazan A Soofi
*Assistant Examiner* — Naeem Taslim Alam
(74) *Attorney, Agent, or Firm* — Finnegan, Henderson, Farabow, Garrett & Dunner, LLP

(57) ABSTRACT

A vehicle comprising an internal combustion engine, a preceding vehicle information acquiring device for acquiring preceding vehicle information relating to a preceding vehicle, including a parameter relating to a distance between vehicles which becomes greater the wider the distance between a host vehicle and the preceding vehicle, and an electronic control unit for controlling the internal combustion engine, in which, the electronic control unit is configured to initiate an idle reduction mode where the internal combustion engine is made to automatically stop when a preset engine stop condition stands and to continue the idle reduction mode if the preceding vehicle is decelerating or has stopped and to make the internal combustion engine automatically restart if the preceding vehicle is accelerating or is running at an equal speed when the parameter becomes a first predetermined value or more during the idle reduction mode.

7 Claims, 4 Drawing Sheets

(51) Int. Cl.
   *F02N 11/00* (2006.01)
   *B60W 10/06* (2006.01)
   *B60W 30/18* (2012.01)
   *B60W 20/10* (2016.01)

(52) U.S. Cl.
   CPC ............ *B60W 10/08* (2013.01); *B60W 20/00* (2013.01); *B60W 20/10* (2013.01); *B60W 30/18018* (2013.01); *F02N 11/00* (2013.01); *F02N 11/0837* (2013.01); *B60W 2520/105* (2013.01); *B60W 2554/801* (2020.02); *B60W 2554/804* (2020.02); *B60W 2710/06* (2013.01); *B60W 2710/08* (2013.01); *B60Y 2200/91* (2013.01); *B60Y 2200/92* (2013.01); *B60Y 2300/192* (2013.01); *F02N 2200/125* (2013.01)

(58) Field of Classification Search
   CPC ..... B60W 30/18018; B60W 2554/804; B60W 2554/801; B60W 2520/105; B60W 2710/06; B60W 2710/08; B60K 6/20; B60L 15/00; F02N 11/00; F02N 11/0837; F02N 2200/125; B60Y 2200/91; B60Y 2200/92; B60Y 2300/192
   See application file for complete search history.

(56) References Cited

U.S. PATENT DOCUMENTS

| | | | |
|---|---|---|---|
| 2006/0142121 A1* | 6/2006 | Moriya | F02N 11/0837 477/199 |
| 2007/0112494 A1* | 5/2007 | Naik | B60K 31/0008 701/55 |
| 2009/0312933 A1* | 12/2009 | Hoetzer | F02N 11/0837 701/102 |
| 2011/0257862 A1* | 10/2011 | Lee | B60T 7/22 701/96 |
| 2012/0016573 A1* | 1/2012 | Ellis | B60K 31/0008 701/112 |
| 2013/0103235 A1* | 4/2013 | Lee | B60W 30/18063 701/22 |
| 2013/0241445 A1 | 9/2013 | Tang | |
| 2014/0288798 A1* | 9/2014 | Ando | B60W 30/14 701/93 |
| 2015/0204253 A1* | 7/2015 | Yang | F02N 11/0837 701/113 |
| 2015/0206430 A1* | 7/2015 | Yang | G08G 1/166 340/435 |
| 2015/0266476 A1 | 9/2015 | Sangameswaran et al. | |
| 2016/0016469 A1 | 1/2016 | Yamada | |
| 2016/0232414 A1 | 8/2016 | Salomonsson | B60Q 1/08 |
| 2017/0001640 A1* | 1/2017 | Asakura | B60W 30/16 |
| 2018/0365992 A1* | 12/2018 | Schneider | G08G 1/09675 |
| 2020/0298890 A1* | 9/2020 | Miyagawa | B60W 10/02 |

FOREIGN PATENT DOCUMENTS

| | | |
|---|---|---|
| JP | 2014-184879 A | 10/2014 |
| JP | 2016-025683 A | 2/2016 |
| JP | 2016-070242 A | 5/2016 |
| KR | 10-2011-0114986 A | 10/2011 |
| KR | 10-2013-0042967 A | 4/2013 |
| WO | WO2013-175092 A1 | 11/2013 |

* cited by examiner

VEHICLE

CROSS-REFERENCE TO RELATED APPLICATION

This application claims priority based on Japanese Patent Application No. 2017-206428 filed with the Japan Patent Office on Oct. 25, 2017, the entire contents of which are incorporated into the present specification by reference.

FIELD

The present disclosure relates to a vehicle.

BACKGROUND

JP2006-316644A discloses a conventional vehicle where when an amount of change of a distance from a preceding vehicle becomes a predetermined amount or more, it is judged that the preceding vehicle has started to move and an internal combustion engine in an idle reduction mode is automatically made to restart. Due to this, it is considered possible to make a host vehicle smoothly start moving along with the preceding vehicle starting to move.

SUMMARY

However, sometimes, for example, when the host vehicle temporarily stops due to congestion etc., the preceding vehicle will start to move (accelerate), the amount of change of the distance from the preceding vehicle will become a predetermined amount or more, then the preceding vehicle will immediately end up decelerating and stopping. At the time of such traffic conditions, even if noticing the preceding vehicle starting to move, some drivers may not start to move the host vehicle. Therefore, if restarting the internal combustion engine, the fuel efficiency is liable to deteriorate. That is, in the case of the conventional vehicle explained above, if stopping in the idle reduction mode, the internal combustion engine cannot be suitably restarted in accordance with the state of movement of the preceding vehicle and in turn the traffic conditions, so the fuel efficiency is liable to deteriorate.

Further, in the case of an electric vehicle provided with a traction motor instead of an internal combustion engine, it is possible to drive the traction motor in advance to make it generate a drive force corresponding to the creep torque when the preceding vehicle starts to move and thereby make the host vehicle start to move smoothly tracking the preceding vehicle starting to move. However, if ending up driving the traction motor despite the driver not intending to start to move the vehicle, electric power will continue to be wastefully consumed while the vehicle is stopped, so the electrical power efficiency is liable to deteriorate.

The present disclosure was made focusing on this problem and has as its object to keep the fuel efficiency or electrical power efficiency from deteriorating.

To solve the above problem, a vehicle according to one aspect of the present disclosure comprises a vehicle drive source, a preceding vehicle information acquiring device for acquiring preceding vehicle information relating to a preceding vehicle, including a parameter relating to a distance between vehicles which becomes greater the wider the distance between a host vehicle and the preceding vehicle, and an electronic control unit configured to control the vehicle drive source. Further, an internal combustion engine is provided as the vehicle drive source, and the electronic control unit is configured to initiate an idle reduction mode where the internal combustion engine is automatically made to stop when a preset engine stop condition stands and to continue the idle reduction mode if the preceding vehicle is decelerating or has stopped and to automatically make the internal combustion engine restart if the preceding vehicle is accelerating or is running at an equal speed when the parameter becomes a first predetermined value or more during the idle reduction mode.

Further, a vehicle according to another aspect of the present disclosure comprises a vehicle drive source, a preceding vehicle information acquiring device for acquiring preceding vehicle information relating to a preceding vehicle, including a parameter relating to a distance between vehicles which becomes greater the wider the distance between a host vehicle and the preceding vehicle, and an electronic control unit configured to control the vehicle drive source. Further, a traction motor is provided as the vehicle drive source, and the electronic control unit is configured so that it does not drive the traction motor if the preceding vehicle is decelerating or has stopped and drives the traction motor if the preceding vehicle is accelerating or running at an equal speed when the parameter becomes a first predetermined value or more while the vehicle is at a stop.

According to the vehicles according to these aspects of the present disclosure, it is possible to keep the fuel efficiency or electric power efficiency from deteriorating.

DESCRIPTION OF EMBODIMENTS

Figure 1:
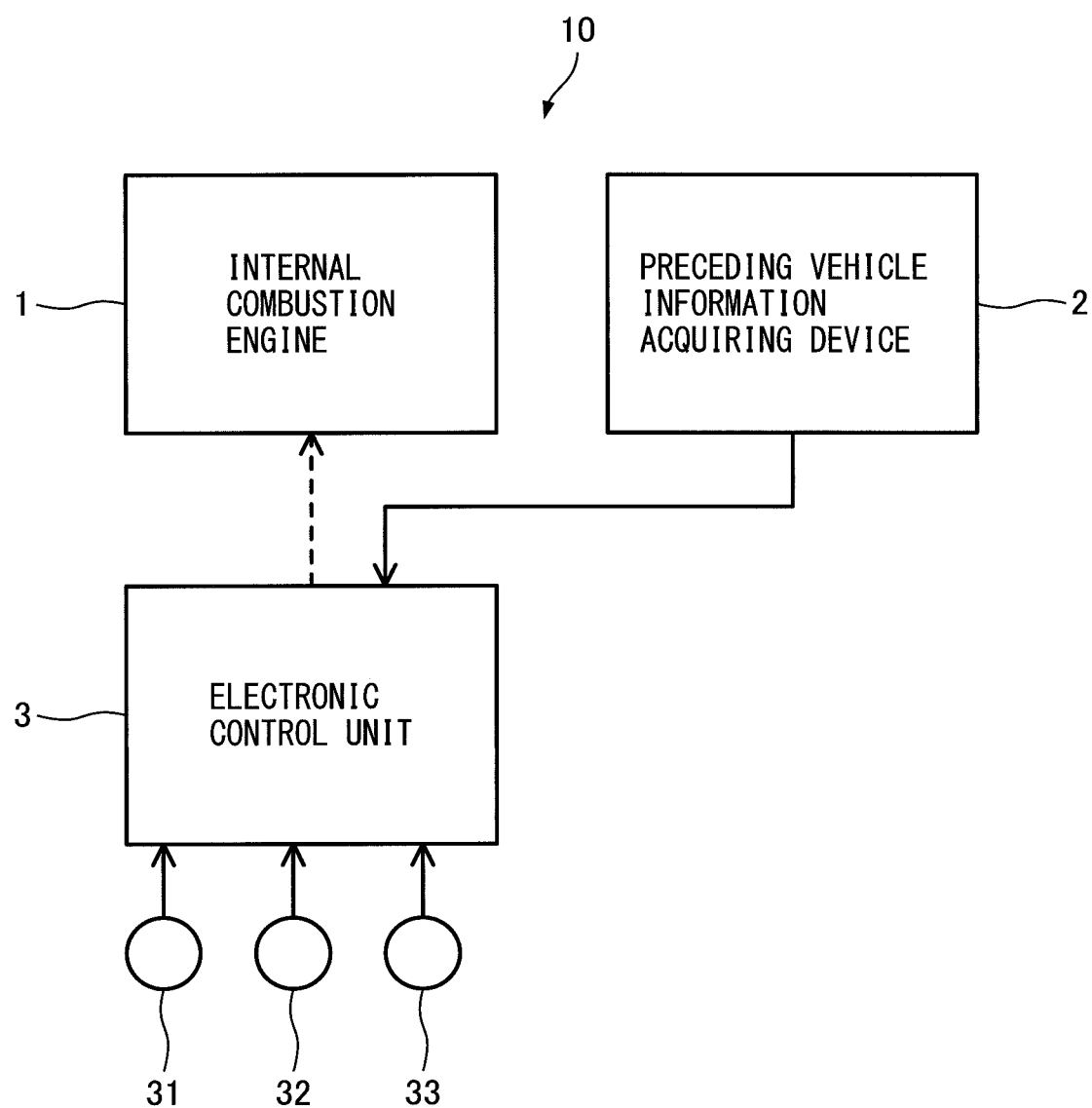
FIG. 1 is a schematic view of the configuration of an idle reduction control system in a vehicle according to a first embodiment of the present disclosure.

Below, referring to the drawings, embodiments of the present disclosure will be explained in detail. Note that, in the following explanation, similar components are assigned the same reference notations.

FIG. 1 is a schematic view of the configuration of an idle reduction control system in a vehicle 10 according to a first embodiment of the present disclosure.

A vehicle 10 comprises an internal combustion engine 1 as a vehicle drive source, a preceding vehicle information acquiring device 2, and an electronic control unit 3.

The internal combustion engine 1 generates a drive force for driving the vehicle 10.

The preceding vehicle information acquiring device 2 is a device which, for example, acquires a distance between a host vehicle and a preceding vehicle or a parameter relating to a distance between vehicles which tends to become greater the wider the distance between the host vehicle and the preceding vehicle such as the distance of movement of the preceding vehicle after the preceding vehicle starts to move and the time period of movement of the preceding vehicle after the preceding vehicle starts to move or information relating to the preceding vehicle such as the speed and acceleration of the preceding vehicle (below, referred to as "preceding vehicle information") and transmits the acquired preceding vehicle information to the electronic control unit 3. As such a preceding vehicle information acquiring device 2, for example, a milliwave radar sensor or camera for capturing the front of the host vehicle, a vehicle-to-vehicle communicating device for vehicle-to-vehicle communication with another vehicle, etc. may be mentioned.

In the present embodiment, a milliwave radar sensor is used as the preceding vehicle information acquiring device 2, the distance from the preceding vehicle and the speed and acceleration of the preceding vehicle are calculated based on a reflected wave of a milliwave fired to the front of the host vehicle, and these are transmitted as the preceding vehicle information to the electronic control unit 3. Note that the preceding vehicle information acquiring device 2 may also be configured by a plurality of devices such as the above-mentioned milliwave radar sensor, camera, etc.

The electronic control unit 3 is a microcomputer provided with components connected with each other by a bidirectional bus such as a central processing unit (CPU), read only memory (ROM), random access memory (RAM), input port, and output port.

The electronic control unit 3 is configured to be able to perform control to start an idle reduction mode where the internal combustion engine 1 is made to automatically stop when a predetermined engine stop condition stands and make the internal combustion engine 1 automatically restart when a preset engine restart condition stands (below, referred to as "idle reduction control"). The electronic control unit 3 receives not only the above-mentioned preceding vehicle information, but also information (signals) from various sensors required for the idle reduction control such as an accelerator stroke sensor 31 for detecting an amount of depression of an accelerator pedal (below referred to as an "amount of accelerator depression"), brake stroke sensor 32 for detecting an amount of depression of a brake pedal (below, referred to as an "amount of brake pedal depression"), and an SOC sensor 33 for detecting an amount of charging of a battery (not shown) mounted in the vehicle 10.

Below, the idle reduction control according to the present embodiment which the electronic control unit 3 performs will be explained.

If a host vehicle temporarily stops due to a red light etc., sometimes the driver will not notice the preceding vehicle starting to move and will be slow to start to move the host vehicle. In particular, when temporarily stopping in the idle reduction state, it is necessary to make the internal combustion engine 1 in the idle reduction state restart before starting to move the host vehicle, so the time from when the driver notices the preceding vehicle starting to move to when starting to move the host vehicle becomes longer and the host vehicle is easily more greatly delayed in starting to move. Such a delay in starting to move the vehicle 10 is liable to cause congestion.

As the method of suppressing such a delay in starting to move the vehicle 10, for example, as shown in the prior art described above, it may be considered to judge that the preceding vehicle has started to move and to make the internal combustion engine 1 in the idle reduction state restart when the amount of change in the distance from the preceding vehicle becomes a predetermined amount or more. Due to this, it is possible to draw the attention of the driver to make him notice the preceding vehicle starting to move by the noise or vibration caused by restart of the internal combustion engine 1 and possible to make the driver start to move the host vehicle immediately after noticing the preceding vehicle starting to move.

However, for example, when the host vehicle temporarily stops due to congestion etc., sometimes the preceding vehicle starts to move (accelerates), the amount of change of distance from the preceding vehicle becomes a predetermined amount or more, then the preceding vehicle ends up immediately decelerating and stopping. At such a time, even if having noticed the preceding vehicle starting to move, the driver might not start to move the host vehicle, so if restarting the internal combustion engine 1, the fuel efficiency or the exhaust emission will deteriorate.

Therefore, in the present embodiment, when the host vehicle had stopped in the idle reduction mode and the distance from the preceding vehicle became a predetermined distance A1 or more, it would be judged if the preceding vehicle was decelerating and if the preceding vehicle was decelerating, the idle reduction mode would be made to continue, while if the preceding vehicle was not decelerating (that is, if it was accelerating or was running at an equal speed), the internal combustion engine 1 would be made to automatically restart. That is, when the host vehicle had stopped in the idle reduction mode and there was a possibility of the driver not noticing the preceding vehicle starting to move, it would be judged whether to restart the internal combustion engine 1 in accordance with the state of movement of the preceding vehicle and in turn the traffic conditions.

Figure 2:
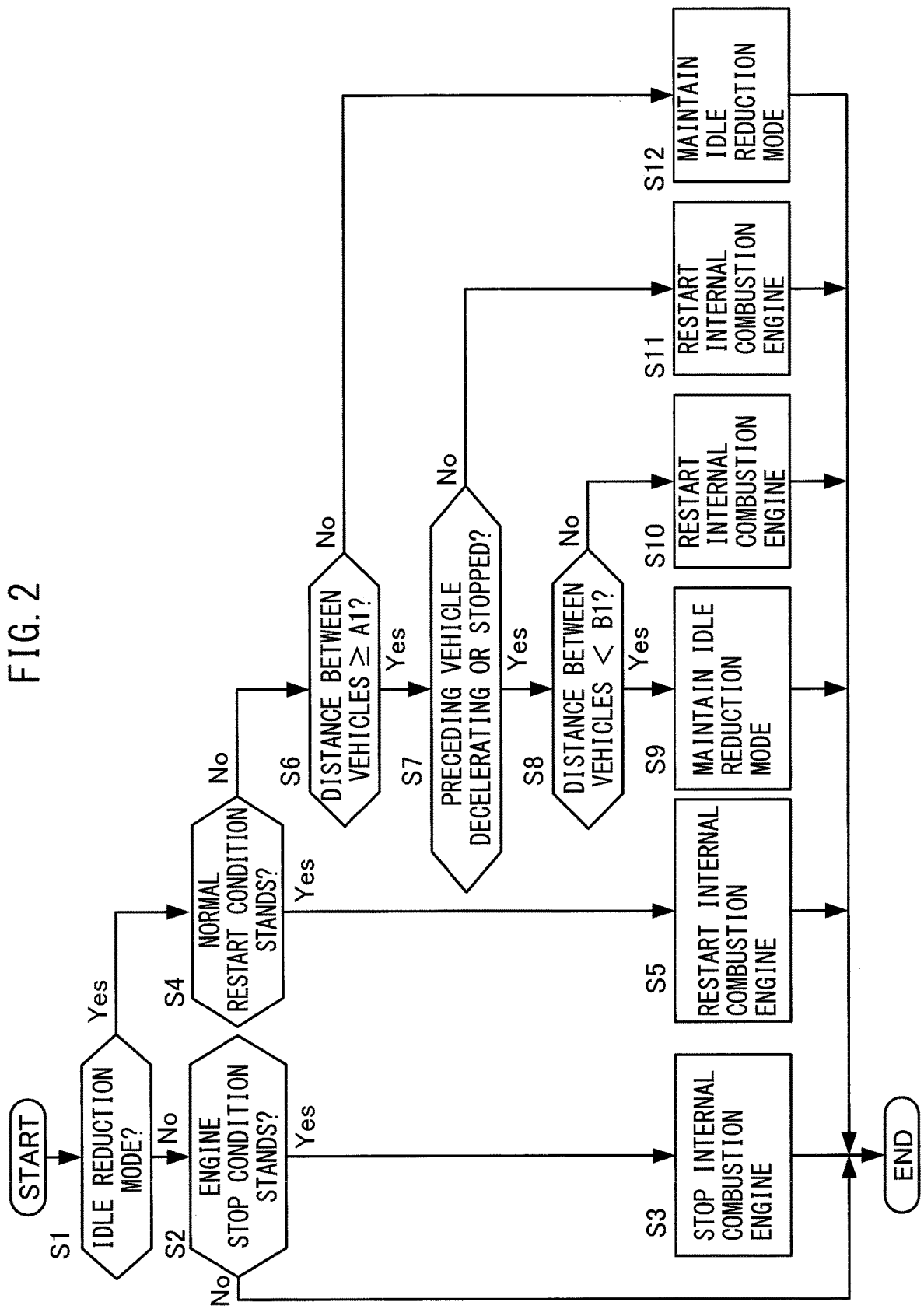
FIG. 2 is a flow chart for explaining idle reduction control according to the first embodiment of the present disclosure.

FIG. 2 is a flow chart for explaining the idle reduction control according to the present embodiment. The electronic control unit 3 repeatedly performs the present routine during operation of the vehicle 10 by a predetermined processing period.

At step S1, the electronic control unit 3 judges if the engine is in the idle reduction mode. The electronic control unit 3 proceeds to the processing of step S2 if the engine is not in the idle reduction mode. On the other hand, the electronic control unit 3 proceeds to the processing of step S4 if the engine is in the idle reduction mode.

At step S2, the electronic control unit 3 judges if the engine stop condition stands. The electronic control unit 3 proceeds to the processing of step S3 if the engine stop condition stands. On the other hand, the electronic control unit 3 ends the current processing if the engine stop condition does not stand.

Note that as the engine stop condition, for example, the speed of the vehicle (vehicle speed) being 0 km/h, the brake pedal being depressed (that is, the amount of depression of the brake pedal being a constant amount or more), the accelerator pedal not being depressed (that is, the amount of depression of the accelerator pedal being zero), the amount of charging of the battery being a predetermined amount or more, etc. may be mentioned.

At step S3, the electronic control unit 3 makes the internal combustion engine 1 automatically stop. Due to this, it is possible to improve the fuel efficiency, exhaust emissions, and sound and vibration performance while the vehicle is at a temporary stop such as at a red light, during congestion, etc.

At step S4, the electronic control unit 3, for example, judges if an engine restart condition other than the engine restart condition according to the present embodiment explained at step S6 on, such as the driver intending to start to move the vehicle 10 (below, referred to as the "normal restart condition"), stands. The electronic control unit 3 proceeds to the processing of step S5 if the normal restart condition stands. On the other hand, the electronic control unit 3 proceeds to the processing of step S6 on so as to judge whether to make the internal combustion engine 1 restart in accordance with the traffic conditions if the normal restart condition does not stand.

Note that as the normal restart condition, for example, the brake pedal not being depressed (that is, the amount of depression of the brake pedal being zero), the shift lever being in the drive range (for example the D range or R range), etc. may be mentioned.

At step S5, the electronic control unit 3 makes the internal combustion engine 1 automatically restart.

At step S6, the electronic control unit 3 judges if the distance from the preceding vehicle is the predetermined first distance A1 or more. The first distance A1 is the distance between vehicles at which it is believed the host vehicle should be made to start to move if under normal traffic conditions where no congestion has occurred. The first distance A1 may be a preset fixed value or may be made able to be changed by the preference of the driver. The electronic control unit 3 judges there is a possibility of the driver not noticing the preceding vehicle starting to move and proceeds to the processing of step S7 if the distance between vehicles is the first distance A1 or more. On the other hand, the electronic control unit 3 proceeds to the processing of step S12 if the distance between vehicles is less than the first distance A1.

At step S7, the electronic control unit 3 judges if the preceding vehicle is decelerating or has stopped after decelerating. The electronic control unit 3 proceeds to the processing of step S8 if the preceding vehicle is decelerating or has stopped. On the other hand, the electronic control unit 3 proceeds to the processing of step S11 if the preceding vehicle is accelerating or is running at an equal speed.

In the present embodiment, the electronic control unit 3 judges that the preceding vehicle is decelerating if the acceleration of the preceding vehicle is less than 0 m/s$^2$ and judges that the preceding vehicle has stopped if the speed of the preceding vehicle is 0 km/h. Further, the electronic control unit 3 judges that the preceding vehicle is accelerating or is running at an equal speed if the acceleration of the preceding vehicle is 0 m/s$^2$ or more and the speed of the preceding vehicle is greater than 0 km/h.

At step S8, the electronic control unit 3 judges if the distance from the preceding vehicle is less than a predetermined second distance B1 larger than the first distance A1. The second distance B1, if considering the rear vehicle, is the distance between vehicles at which it is believed the host vehicle should be made to start to move regardless of the traffic conditions. The second distance B1 may be a preset fixed value or may be made able to be changed by the preference of the driver. The electronic control unit 3 proceeds to the processing of step S9 if the distance between vehicles is less than the second distance B1. On the other hand, the electronic control unit 3 proceeds to the processing of step S10 if the distance between vehicles is the second distance B1 or more.

At step S9, the electronic control unit 3 makes the idle reduction mode continue so as to keep the fuel efficiency etc. from deteriorating due to restart of the internal combustion engine 1 since the driver might not start to move the host vehicle even if noticing the preceding vehicle starting to move.

At step S10, the electronic control unit 3 makes the internal combustion engine 1 restart to prepare for starting to move the host vehicle since it is believed that the host vehicle should be made to start regardless of the traffic conditions.

Note that when making the internal combustion engine 1 restart regardless of the intent of the driver to start to move the vehicle 10, when making the internal combustion engine 1 restart or before that, it is possible to inform the driver of the preceding vehicle starting to move by, for example, sounding a buzzer or displaying text information or graphic information for conveying the fact of the preceding vehicle starting to move on a display mounted in the vehicle. Further, if trying to definitely inform the drive of the fact of the preceding vehicle starting to move when making the internal combustion engine 1 restart or before that, it is also possible to not make the internal combustion engine 1 restart and to continue the idle reduction mode when, due to for example a buzzer malfunction or for some other reason, the fact of the preceding vehicle starting to move can no longer be able to be informed to the driver.

At step S11, if the preceding vehicle is accelerating or is running at an equal speed even if the distance between vehicles has become the first distance A1 or more, the electronic control unit 3 makes the internal combustion engine 1 restart to prepare for starting to move the host vehicle since the driver might start to move the host vehicle if the traffic conditions are normal ones where no congestion will occur and the driver notices that the preceding vehicle has started to move.

At step S12, the electronic control unit 3 makes the idle reduction mode continue since the distance between vehicles is less than the first distance A1 and it is considered within the range of the normal distance between vehicles while temporarily stopping.

Further, in the flow chart of FIG. 2, at step S6 or step S8, the distance between vehicles was used as the parameter relating to the distance between vehicles, but instead of the distance between vehicles, it is also possible to use the distance of movement of the preceding vehicle after the preceding vehicle has started to move or the time period of movement of the preceding vehicle after the preceding vehicle has started to move so as to judge to what extent the preceding vehicle has drawn away from the host vehicle. Specifically, at for example step S6, it is possible to judge if the distance of movement of the preceding vehicle is a predetermined first distance A2 or more. The first distance A2 corresponds to the first distance A1 minus the distance between the host vehicle and the preceding vehicle before the preceding vehicle starts to move. Further, at step S6, it is also possible to judge if the time period of movement of the preceding vehicle is a predetermined time period A3 or more.

Figure 3:
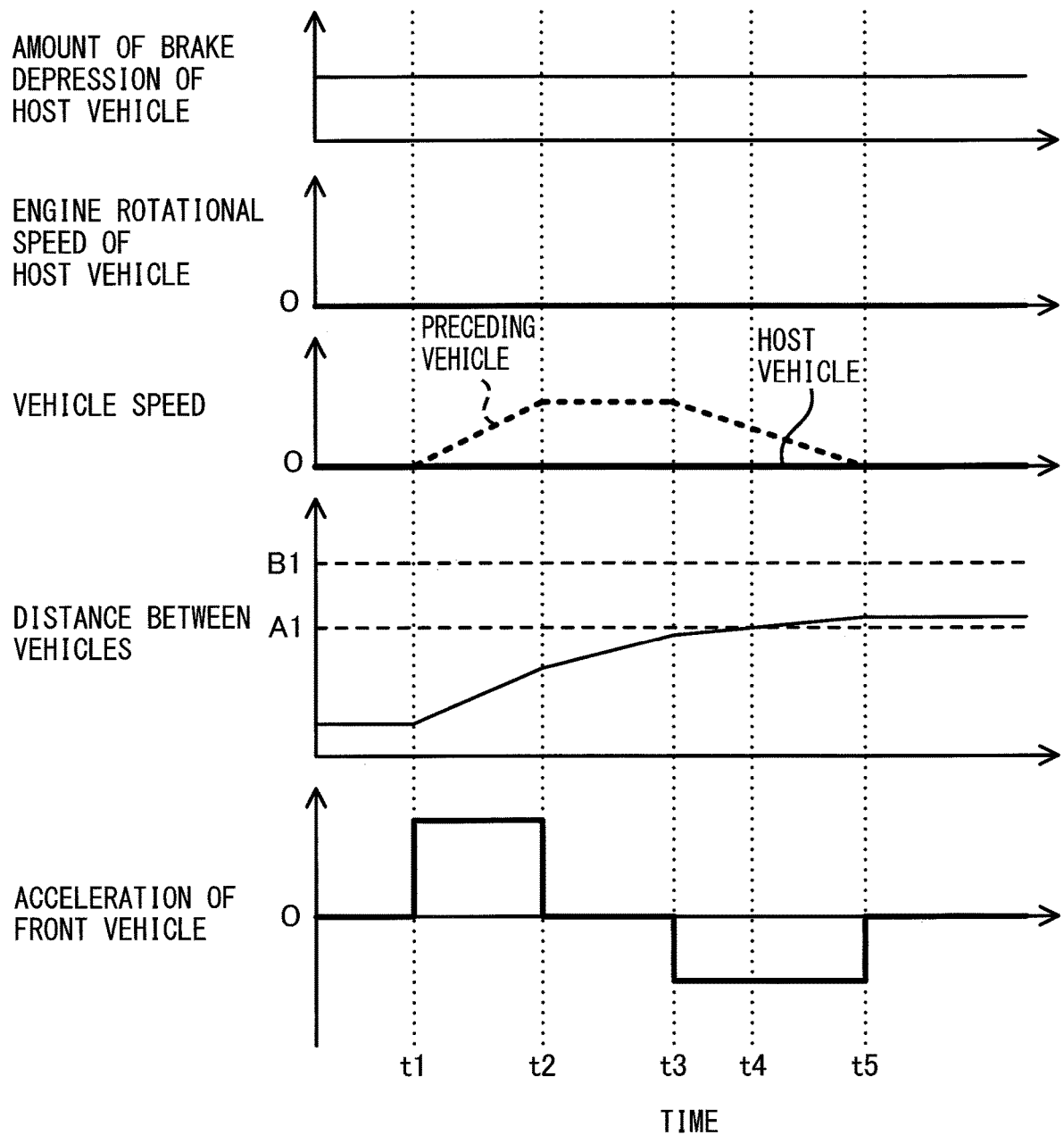
FIG. 3 is a time chart for explaining the operation in idle reduction control according to the first embodiment of the present disclosure.

FIG. 3 is a time chart for explaining the operation of the idle reduction control according to the present embodiment.

The preceding vehicle temporarily stops before the time t1, starts to move at the time t1, then accelerates up to the time t2. From the time t2 to the time t3, it is driven at an equal speed. From the time t3, it decelerates and at the time t5 it is further temporarily stopped.

The host vehicle, before the time t1, temporarily stops in the same way as the preceding vehicle and is in the idle reduction mode. During the idle reduction mode, until the distance between vehicles becomes the first distance A1 or more, for example, the amount of brake depression becomes zero etc., basically the idle reduction mode is continued until the driver intends to start to move the vehicle 10. In this time chart, the brake pedal is depressed from the time t1 on as well. Until the time 4, the distance between vehicles is also less than the first distance A1, so up to the time t4, the idle reduction mode is continued.

If, at the time t4, during the idle reduction mode, the distance between vehicles becomes the first distance A1 or more, there is a possibility of the driver not noticing the preceding vehicle starting to move, so it is judged whether to restart the internal combustion engine 1 in accordance with the state of movement of the preceding vehicle and in turn the traffic conditions. Specifically, it is judged whether the preceding vehicle is decelerating or in the stopped state after deceleration.

In this time chart, the preceding vehicle is decelerating from the time t4 to the time t5 in the state where the distance between vehicles is less than the second distance B1. At the time t5 on, the preceding vehicle has stopped, so even if the driver notices the preceding vehicle starting to move, he may not start to move the host vehicle. Due to this, the idle reduction mode is made to continue even from the time t4 on. Due to this, it is possible to keep the fuel efficiency etc. from deteriorating due to restart of the internal combustion engine 1.

The vehicle 10 according to the present embodiment explained above is provided with an internal combustion engine 1 as the vehicle drive source, a preceding vehicle information acquiring device 2 for acquiring preceding vehicle information relating to a preceding vehicle, including the distance between vehicles (parameter relating to distance between vehicles which becomes greater the wider the distance between the host vehicle and the preceding vehicle), and an electronic control unit 3 for controlling the vehicle drive source.

Further, the electronic control unit 3 is configured to initiate the idle reduction mode where the internal combustion engine 1 is automatically made to stop when a preset engine stop condition stands and to make the idle reduction mode continue if the preceding vehicle is decelerating or has stopped and make the internal combustion engine 1 automatically restart if the preceding vehicle is accelerating or is running at an equal speed when the distance between vehicles (parameter) becomes the first distance A1 (first predetermined value) or more during the idle reduction mode. More specifically, the electronic control unit 3 is configured to judge that the preceding vehicle is decelerating if the acceleration of the preceding vehicle is less than zero, judge that the preceding vehicle has stopped if the speed of the preceding vehicle is zero, and judge that the preceding vehicle is accelerating or is running at an equal speed if the acceleration of the preceding vehicle is zero or more and the speed of the preceding vehicle is larger than zero. Note that instead of the distance between vehicles, it is also possible to use the distance of movement of the preceding vehicle after the preceding vehicle starts to move and the time period of movement of the preceding vehicle after the preceding vehicle starts to move.

Due to this, when the distance between vehicles has become the first distance A1 or more during the idle reduction mode, the preceding vehicle might be decelerating or might have stopped and the driver might not start to move the host vehicle even if noticing that the preceding vehicle has started moving. In such a scene, it is possible to continue the idle reduction mode. That is, when the distance between vehicles is the first distance A1 or more during the idle reduction mode, it is possible to suitably make the internal combustion engine 1 restart according to the state of movement of the preceding vehicle and in turn the traffic conditions. For this reason, it is possible to keep the internal combustion engine 1 from restarting regardless of not making the host vehicle start to move, so the fuel efficiency and the exhaust emission can be kept from deteriorating.

Further, the electronic control unit 3 according to the present embodiment is further configured to automatically make the internal combustion engine 1 restart when the distance between vehicles (parameter) becomes a second distance B1 (second predetermined value) or more larger than the first distance A1 (first predetermined value) during the idle reduction mode.

Due to this, in a scene where the distance between vehicles becomes greater and the vehicle should be made to start to move regardless of the traffic conditions, it is possible to keep the idle reduction mode from ending up being made to continue and start of movement of the vehicle 10 can be kept from being delayed.

Above, embodiments of the present disclosure were explained, but the embodiments only show part of the examples of application of the present disclosure and are not designed to limit the technical scope of the present disclosure to the specific configurations of the embodiments.

Figure 4:
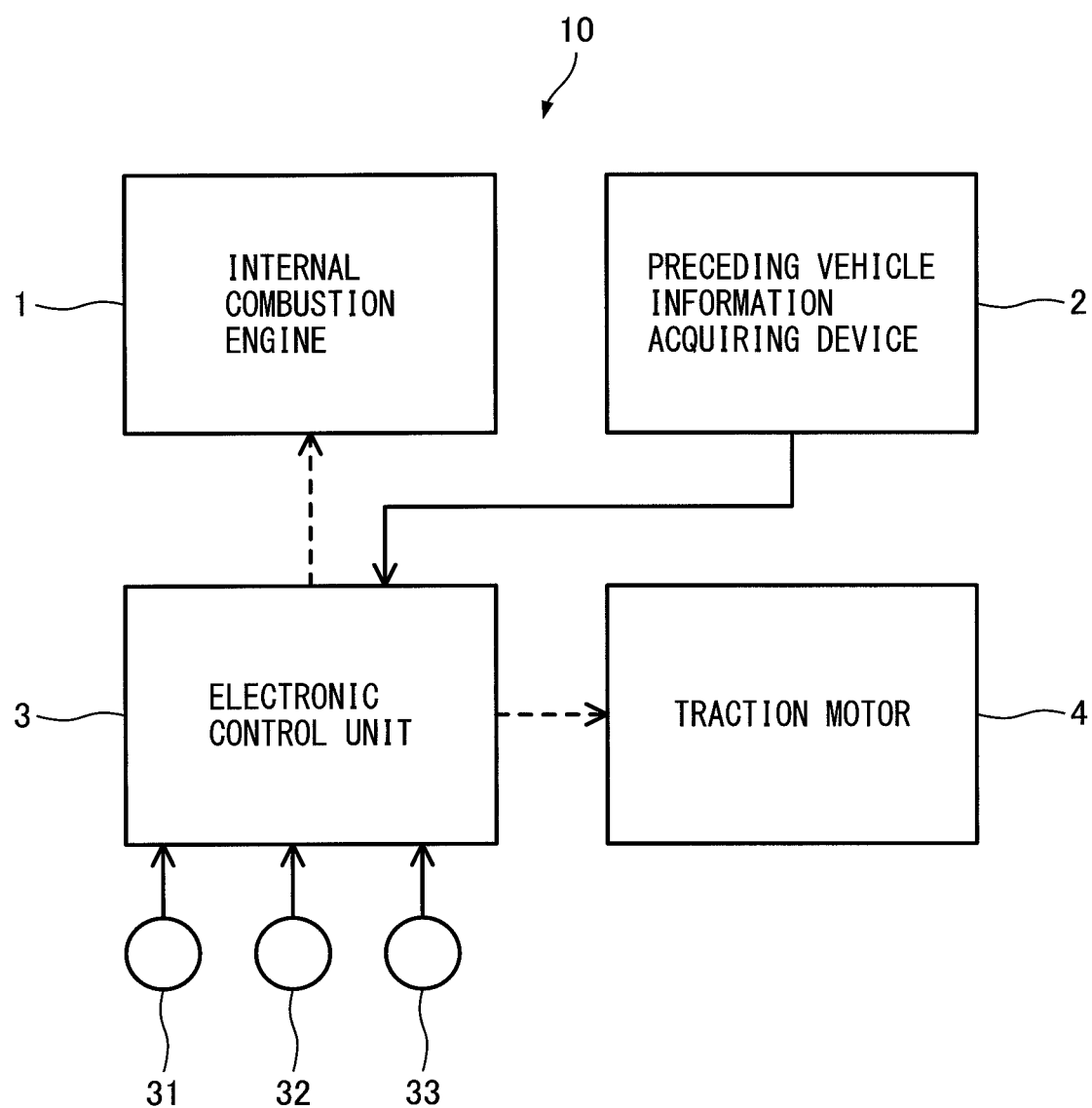
FIG. 4 is a schematic view of the configuration of an idle reduction control system in a vehicle according to a modification of the present disclosure.

For example, as shown in FIG. 4, in the case of a vehicle 10 provided with a traction motor 4 in addition to an internal combustion engine 1 as a vehicle drive source (for example, a hybrid vehicle or a plug-in hybrid vehicle), instead of making the internal combustion engine 1 restart at step S10 or step S11 in the flow chart of FIG. 2, it is also possible to use the traction motor 4 to generate a drive force corresponding to the creep torque as required.

That is, the electronic control unit 3 may be configured so as to make the internal combustion engine 1 automatically restart or to drive the traction motor 4 when the distance between vehicles (parameter) becomes the first distance A1 (first predetermined value) or more during the idle reduction mode if the preceding vehicle is accelerating or is running at an equal speed.

Note that, instead of making the internal combustion engine 1 restart in this way, if making the traction motor 4 generate a drive force corresponding to the creep torque, unlike the case of restarting the internal combustion engine 1, almost no noise or vibration will be generated, so it is not possible to use the noise or vibration caused by restart of the internal combustion engine 1 to draw the attention of the driver to the front. Therefore, it is desirable to inform the driver of the fact of the preceding vehicle starting to move by for example a buzzer etc. as explained above. Further, since it is difficult to draw the attention of the driver to the front compared with when restarting the internal combustion engine 1, to reliably inform the driver of the preceding vehicle starting to move, it is also possible to make the buzzer sound larger than the buzzer sound when making the internal combustion engine 1 restart.

Further, while not shown, in the case of a vehicle 10 provided with a traction motor 4 instead of an internal combustion engine 1 as a vehicle drive source (for example, an electric vehicle), the electronic control unit 3 may be configured so as to not drive the traction motor 4 if the preceding vehicle is decelerating or stopped and so as to drive the traction motor 4 if the preceding vehicle is accelerating or running at an equal speed when the distance between vehicles (parameter) becomes the first distance A1 (first predetermined value) while the host vehicle is stopped. Due to this, it is possible to keep electric power from being wastefully consumed while the vehicle is stopped, so it is possible to suppress deterioration of the electric power efficiency.

Further, in the above embodiments, the distance from the preceding vehicle (distance of movement or time period of movement) were calculated based on a reflected wave of a milliwave fired from a milliwave radar sensor to the front of the host vehicle, but, for example, it is also possible to estimate these from the speed information etc. of the preceding vehicle obtained through the vehicle-to-vehicle communicating device.

The invention claimed is:

1. A vehicle comprising:
a first vehicle drive source;
a preceding vehicle information acquiring device for acquiring preceding vehicle information relating to a preceding vehicle, including a parameter relating to a distance between vehicles which becomes greater the larger the distance between the vehicle and the preceding vehicle; and
an electronic control unit configured to:
control the first vehicle drive source, wherein an internal combustion engine is provided as the first vehicle drive source,
initiate an idle reduction mode where the internal combustion engine is made to automatically stop when a preset engine stop condition stands,
determine that the preceding vehicle is stopped or decelerating when the parameter becomes a first predetermined value or more during the idle reduction mode,
continue the idle reduction mode if the preceding vehicle is decelerating or has stopped,
automatically restart the internal combustion engine if the preceding vehicle is accelerating or is running at a constant speed when the parameter becomes the first predetermined value or more during the idle reduction mode,
and
automatically restart the internal combustion engine when the parameter becomes a second predetermined value larger than the first predetermined value or more during the idle reduction mode.

2. The vehicle according to claim 1,
further comprising a traction motor as a second vehicle drive source,
wherein the electronic control unit is further configured to make the internal combustion engine automatically restart or drive the traction motor if the preceding vehicle is accelerating or is running at a constant speed when the parameter becomes the first predetermined value or more during the idle reduction mode.

3. A vehicle comprising:
a first vehicle drive source;
a preceding vehicle information acquiring device for acquiring preceding vehicle information relating to a preceding vehicle, including a parameter relating to a distance between vehicles which becomes greater the larger the distance between the vehicle and the preceding vehicle; and
an electronic control unit configured to control the first vehicle drive source,
wherein
a traction motor is provided as a second vehicle drive source and
the electronic control unit is configured:
to determine that the preceding vehicle is stopped or decelerating when the parameter becomes a first predetermined value or more and the traction motor is not being driven;
to not drive the traction motor if the preceding vehicle is decelerating or has stopped and to drive the traction motor if the preceding vehicle is accelerating or is running at a constant speed when the parameter becomes the first predetermined value or more while the vehicle is at a stop;
and
to drive the traction motor when the parameter becomes a second predetermined value larger than the first predetermined value or more while the vehicle is at a stop.

4. The vehicle according to claim 1, wherein
the preceding vehicle information further includes a speed and acceleration of the preceding vehicle and
the electronic control unit is configured to
judge that the preceding vehicle is decelerating if the acceleration of the preceding vehicle is less than zero,
judge that the preceding vehicle has stopped if the speed of the preceding vehicle is zero, and
judge that the preceding vehicle is accelerating or is running at a constant speed if the acceleration of the preceding vehicle is zero or more and the speed of the preceding vehicle is larger than zero.

5. The vehicle according to claim 1, wherein
the parameter is the distance between the vehicle and the preceding vehicle.

6. The vehicle according to claim 1, wherein
the parameter is a distance of movement of the preceding vehicle after the preceding vehicle started moving.

7. The vehicle according to claim 1, wherein
the parameter is a time period of movement of a preceding vehicle from when the preceding vehicle started moving.

* * * * *